US008135216B2

(12) United States Patent
Piramuthu

(10) Patent No.: US 8,135,216 B2
(45) Date of Patent: Mar. 13, 2012

(54) SYSTEMS AND METHODS FOR UNSUPERVISED LOCAL BOUNDARY OR REGION REFINEMENT OF FIGURE MASKS USING OVER AND UNDER SEGMENTATION OF REGIONS

(75) Inventor: Robinson Piramuthu, Oakland, CA (US)

(73) Assignee: FlashFoto, Inc., Las Gatos, CA (US)

( * ) Notice: Subject to any disclaimer, the term of this patent is extended or adjusted under 35 U.S.C. 154(b) by 671 days.

(21) Appl. No.: 12/333,293

(22) Filed: Dec. 11, 2008

(65) Prior Publication Data
US 2009/0148041 A1  Jun. 11, 2009

Related U.S. Application Data

(60) Provisional application No. 61/007,359, filed on Dec. 11, 2007.

(51) Int. Cl.
*G06K 9/34* (2006.01)
*G06K 9/62* (2006.01)
*G06K 9/00* (2006.01)

(52) U.S. Cl. ....................... 382/173; 382/209

(58) Field of Classification Search .................. 382/164, 382/167, 173, 203, 209, 224, 225, 254
See application file for complete search history.

(56) References Cited

U.S. PATENT DOCUMENTS

| 2009/0010539 A1* | 1/2009 | Guarnera et al. | 382/167 |
| 2009/0129675 A1* | 5/2009 | Eggert et al. | 382/173 |
| 2009/0148041 A1* | 6/2009 | Piramuthu | 382/173 |
| 2010/0316288 A1* | 12/2010 | Ip et al. | 382/164 |

* cited by examiner

*Primary Examiner* — Amir Alavi
(74) *Attorney, Agent, or Firm* — Osama Hussain, Esq.

(57) ABSTRACT

An initial figure mask estimation of an image is generated using a figure ground segmentation system, thereby initially assigning each pixel in the image with a first attribute value or a second attribute value. A JigCut region segmentation of the image is generated. The figure mask estimation is processed with the JigCut region segmentation by (i) classifying the pixels of the image in each respective JigCut region in the JigCut region segmentation with the first attribute value when a predetermined number or a predetermined percentage of the pixels within the respective JigCut region have been initially assigned the first attribute value by the initial figure mask estimation and (ii) classifying the pixels of the image in each respective JigCut region in the JigCut region segmentation with the second attribute value otherwise.

14 Claims, 10 Drawing Sheets

2(a)

2(b)

4(a)

4(b)

5(a)

5(b)

6(a)

6(b)

7(a)

7(b)

8(a)

8(b)

9(a)

9(b)

SYSTEMS AND METHODS FOR UNSUPERVISED LOCAL BOUNDARY OR REGION REFINEMENT OF FIGURE MASKS USING OVER AND UNDER SEGMENTATION OF REGIONS

CROSS REFERENCE TO RELATED APPLICATION

This application claims priority to a U.S. provisional patent application No. 61/007,359, filed Dec. 11, 2007, which is hereby incorporated by reference herein in its entirety.

BACKGROUND OF THE INVENTION

Though many people are currently trying to create methods for enabling a computer to accurately determine the foreground of an image, a method which would perform such a task has proven elusive. There have been a few that have come up with solutions (See e.g., Yu and Shi, "Object-Specific Figure-Ground Segmentation", 2003 IEEE Computer Society Conference on Computer Vision and Pattern Recognition, Proceedings, Volume 2, pages 39-45, (which is hereby incorporated by reference herein in its entirety), but even those solutions aren't broad enough to solve the general problem of creating a system or method which would run effectively on any image. Even with the advancements of artificial intelligence, satisfactory solutions for having a computer automatically determine the "figure" and "ground" (according to the definitions in psychology literature or as defined by Gestalt rules of perception) are yet to be discovered. The application of encoding human perception into machine readable code has proven to be a very difficult task.

One method used by some is to create software that is modular in design. Such modular software processes the information in an image using different modules, thereby allowing the results of each module to direct the determination of which portions of the image are "figure" or "ground". This method is based on human perception-based processing which makes use of heuristics, which were discovered in psychological studies of human vision, in order to develop computational methods or modules for use in the process of automated segmentation, labeling and searching of images. Still, even if a system or method is able to estimate what the figure region is within an image, the estimate is never perfect for every image. Indeed, the user must manually fix errors in the estimate which is time consuming and very inefficient. Moreover, humans are very sensitive to boundary errors, thus one of the most painstaking tasks in manually fixing errors in the estimate includes refining the figure region's boundary. Subsequently, because the figure region is often represented as a mask, most of the effort in mask creation is spent in getting a sufficiently accurate boundary of the "figure."

As should be apparent, there is a long-felt and unfulfilled need to provide improved techniques for cleaning up or removing figure mask estimation errors.

SUMMARY

The present invention overcomes the prior art inability to generate suitable figure mask estimations for images. Thus, the present invention alleviates the time and costs of manual correction of figure mask estimations created by prior art systems. Moreover, the present invention reduces the computational expense of a figure mask estimation system. Finally, novel methods and systems for generating suitable figure mask estimations are described herein. In particular, systems and methods for unsupervised local boundary or region refinement of a figure mask using over and under segmentation of regions are disclosed.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

DETAILED DESCRIPTION

Figure 1:
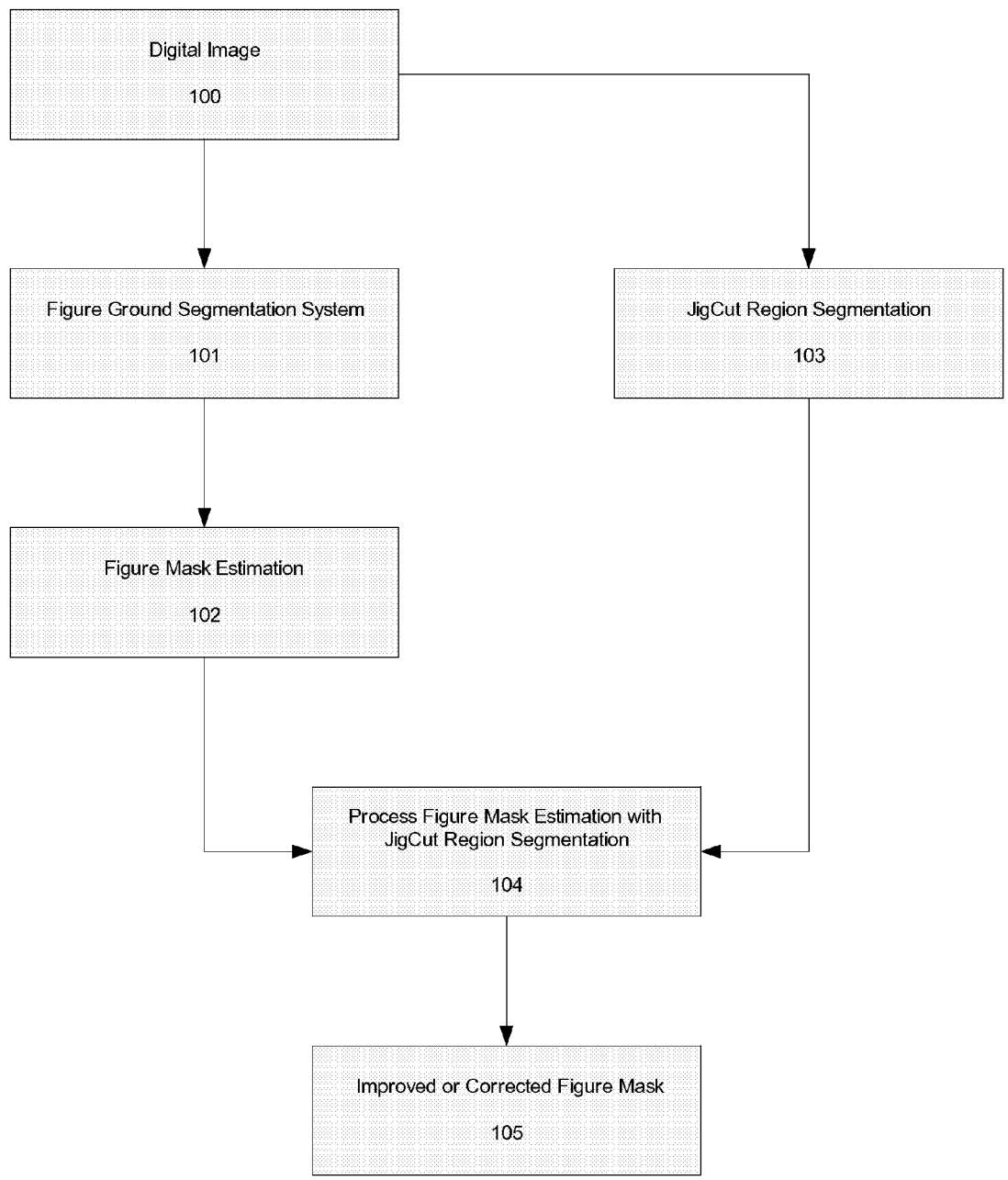
FIG. 1 is a diagrammatic illustration of a system, process or method for unsupervised local boundary or region refinement of a figure mask using over and under segmentation of regions.

Systems and methods for unsupervised local boundary or region refinement of figure masks using over and under segmentation of regions are disclosed.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for tangibly storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the inventions as described herein.

There is a rising need for automatically masking the "figure" in images in areas such as photographic art, publications and other consumer grade photo manipulations. A "figure" is the salient concepts or objects of an image. When creating the mask of the figure for the purposes stated above, one must recognize that humans are sensitive to boundary errors of the figure. Thus, if a figure mask is not created perfectly, the most common categorical error and the one which is the most painstaking to correct, are the errors in the figure region's boundaries. As a result, most of the effort in mask creation is spent in getting sufficiently accurate boundaries of the "figure".

As used herein, in some embodiments, an image is bitmapped (e.g., a bitmap) or pixmapped (e.g., a pixmap). As used herein, a bitmap or pixmap is a type of memory organization or image file format or data structure used to store a digital image. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap means one bit per pixel, while a pixmap means images with multiple bits per pixel. One example of a bitmap is a specific format used in WINDOWS® that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats such as JPEG, TIFF, PNG, and GIF, to name just a few examples, in which the bitmap image, as opposed to the vector image, is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, *Computer Graphics: Principles and Practice, Addison-Wesley Professional*, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel ($2^n$ colors) bitmap, in bytes, can be calculated as: size≈width×height×n/8, where height and width are given in pixels. In this formula, header size and color palette size, if any, are not included. Due to effects of row padding to align each row start to a storage unit boundary such as a word, additional bytes may be needed.

In some embodiments, an image is generated using a web browser for which source code is available, such as MOZILLA® FIREFOX®. An image of a web page can be an image of the rendered web page at a given instant in time or a time averaged representation of the web page over a period of time (e.g., one second or more, ten seconds or more, a minute or more, two minutes or more, etc.).

Thus, consistent with the above description of an image, in instances where an image is a bitmap or a pixmap, a "figure" is the bits in the image that define the salient concepts or objects of an image. For example, in an image depicting one or more humans against a background, the pixels making up the one or more humans could collectively be the "figure" that needs to be distinguished from the pixels that form the background. A mask is used to define the "figure" and thus distinguish the humans from the background.

An image can be viewed as a jigsaw puzzle, where each puzzle piece has contiguous pixels with coherent properties such as same color, texture, brightness, orientation, reflection properties, etc. Similarly, a "figure" mask can be viewed as a union of a subset of these jigsaw puzzle pieces. One embodiment discloses an unsupervised approach to identifying this subset based on a rough "figure" mask.

"Region segmentation" refers to grouping of contiguous pixels with similar properties in an image. These properties can be color, surrounding texture, brightness, orientation, reflection properties, etc. There are several approaches to region segmentation such as normalized cut, mean-shift, and the watershed transform. A segmented region that is created based on any of these approaches is referred to as a "JigCut Region," again because the regions could be compared to the pieces of a jigsaw puzzle.

"Over segmentation" refers to when an image is fragmented into a number of regions that is greater than the number of regions that would result based on general human perception of the image.

"Under segmentation" refers to when an image is fragmented into a number of regions that is less than or equal to the number of regions that would result based on general human perception of the image.

Figure 2:
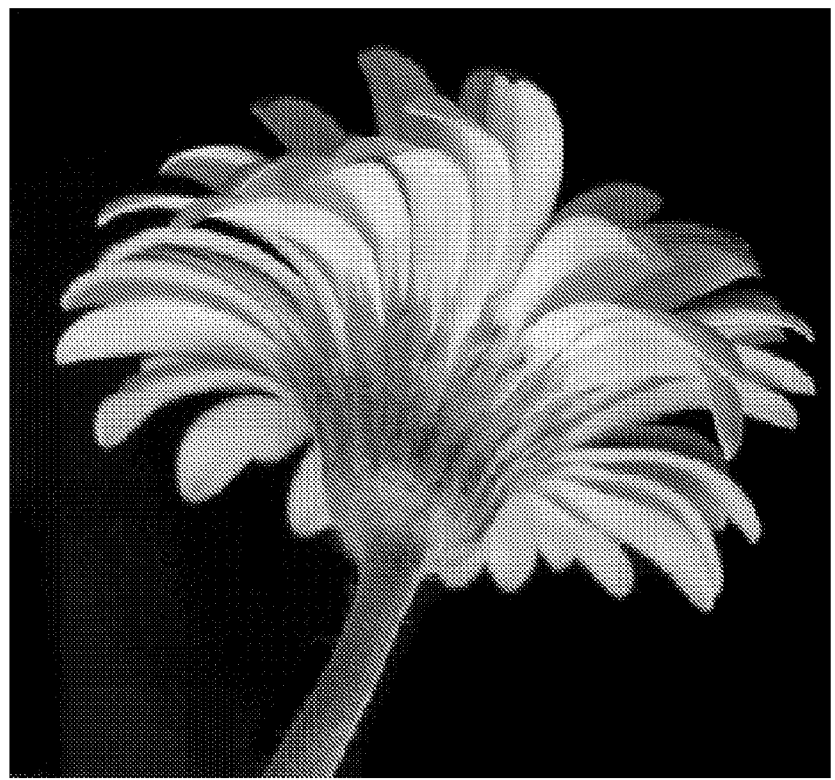
FIG. 2 contains images 2(a) and 2(b) that are sample images that illustrate the possible results obtainable by the systems and methods disclosed herein.
Figure 2:
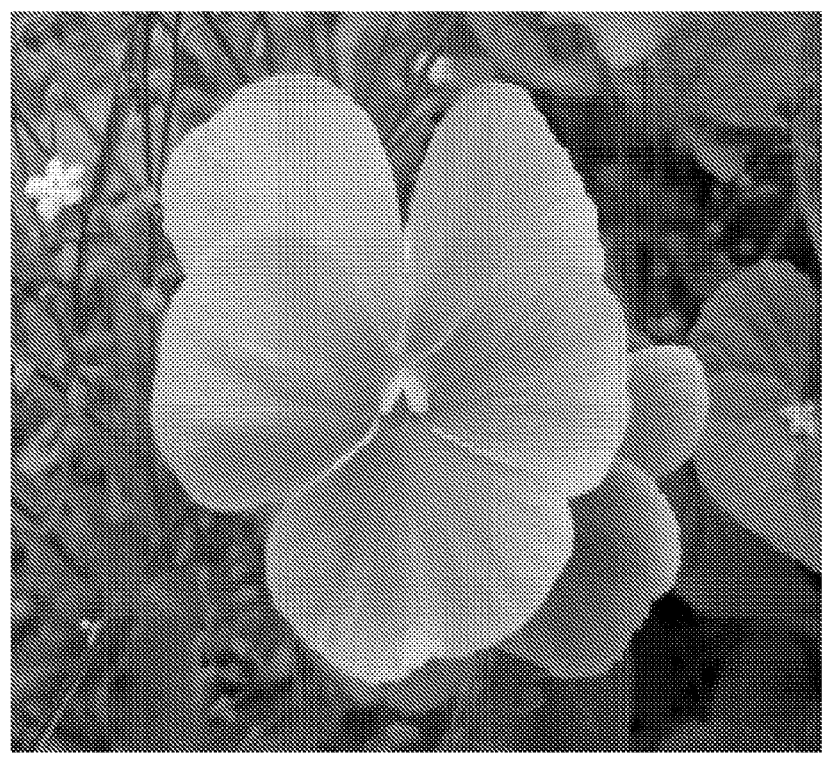

"Figure/Ground Segmentation" refers generally to the identifying, categorizing, or in some way distinguishing a pixel or pixels in an image as belonging to an object or salient feature within the image. As should be apparent to one skilled in the art, this object or salient feature can be referred to as a "figure." Generally, figural pixels are those that "pop-out" of an image—making up the main object(s) of interest in the given image. A "figure" can also be defined based on psychology literature or as defined by Gestalt rules of perception. The pixels not identified, categorized, or in some way distinguished as "figural" can then be considered to fall into the "ground" category. "Ground" can therefore be defined as the portions of the image that are not of particular interest, or a pixel or pixels that act as the background for the "figure." To explain by example, FIG. 2 contains two images in which the "figure" is easily identifiable. In FIG. 2(a) the "figure" is a flower. In FIG. 2(b) the "figure" is also a flower, but with foliage as the "background". Figure/Ground Segmentation is an active topic of research in the field of computer vision. (See e.g., Ren X., Fowlkes C. C., Malik J., "Figure/Ground Assignment in Natural Images," EUROPEAN CONFERENCE ON COMPUTERVISION, vol. 2, pp. 614-627, 2006; Barghout, et al., "Perceptual Information Processing System," UNITED STATES PATENT APPLICATION NO. 20040059754; Peter Nordlund, "Figure-Ground Segmentation Using Multiple Cues," DEPARTMENT OF NUMERICAL ANALYSIS AND COMPUTING SCIENCE, TRITA-NA-P98/05, ISSN 1101-2250, ISRN KTH/NA/P—98/05—SE, CVAP218, each of which is hereby incorporated by reference herein in its entirety.).

Supervised classification of JigCut regions to identify pieces of objects, for example by detecting the type of fur, has been published. See, for example, Barnard & Forsyth, "Learning the Semantics of Words and Pictures," IEEE INTERNATIONAL CONFERENCE ON COMPUTER VISION, vol. 2, pp. 408-415, 2001. In supervised classification of JigCut regions, labels are tagged to each JigCut region based on their similarity to the exemplary JigCut regions collected classifier training. A simple system might label all blue colored JigCut regions as "sky" and all green colored JigCut regions as "vegetation".

Figure/Ground segmentation using region segmentation has been accomplished using complex supervised systems such as those disclosed in Cour & Shi, "Recognizing Objects by Piecing Together the Segmentation Puzzle," IEEE INTERNATIONAL CONFERENCE ON COMPUTER VISION, CVPR, June 2007, pages 1-8, which is hereby incorporated by reference herein in its entirety. Cour & Shi identified different parts of the human body by matching JigCut regions against templates for different body parts found in a database. Once different parts were identified they were grouped together to give meaningful segmentation of pictures of humans.

FIG. 1 is an illustration of a system, process or method for unsupervised local boundary or region refinement of a figure mask using over and under segmentation of regions, according to one embodiment of the present invention. One advantageous aspect of the systems and methods disclosed herein includes the ability to allow one or more steps of to be processed without human intervention. For, example, in some embodiments, each of the steps of any of the methods disclosed herein can be performed without human intervention.

In some embodiments, a digital image 100 is selected for processing. It will be apparent to one skilled in the art that the digital image 100 can be of any size, orientation, or color. The digital image 100 could also be an image of any of a variety of things. For example, the image could be: real-life events or persons, animation, a still frame taken from a video recording, or a digital image that has already been subjected to preprocessing. Thus, it will also be apparent to one skilled in the art that the digital image 100 could have been created in any of multitude of ways, and could be in any of a variety of different formats. This disclosure in no way is meant to limit the methods of creation or selection of the digital image 100 that is used in the present invention. The ability to use any number of different varieties of digital images is an advantageous feature of this invention.

In one embodiment, the selection of the digital image will be, at least, partly determined by whether the digital image has a "figure" within it. FIG. 2 is an illustration of two digital images selected with the determination that the digital images contain a "figure" region. In FIG. 2(a), the digital image contains a flower with a black background. For this example, the flower could be defined as the "figure." In FIG. 2(b), the digital image contains a flower with a foliage background.

Referring to FIG. 1, in accordance with the illustrative embodiment of the present invention, the digital image 100 is processed to effectuate a figure/ground segmentation 101 of the digital image 100 using the figure ground segmentation system 101, which could be implemented in a number of ways. A figure ground segmentation system 101 is any system, process, method, or procedure, or combination thereof, that distinguishes pixels or pixel regions as either the "figure" or "background" of an image. For instance, one example of a figure ground segmentation system is the manual process of human selection or de-selection of pixels or pixel regions that belong to the "figure" or "background" of a digital image 100. A figure ground segmentation system 101 could also be a partly autonomous computer-implemented algorithm.

Figure 3:
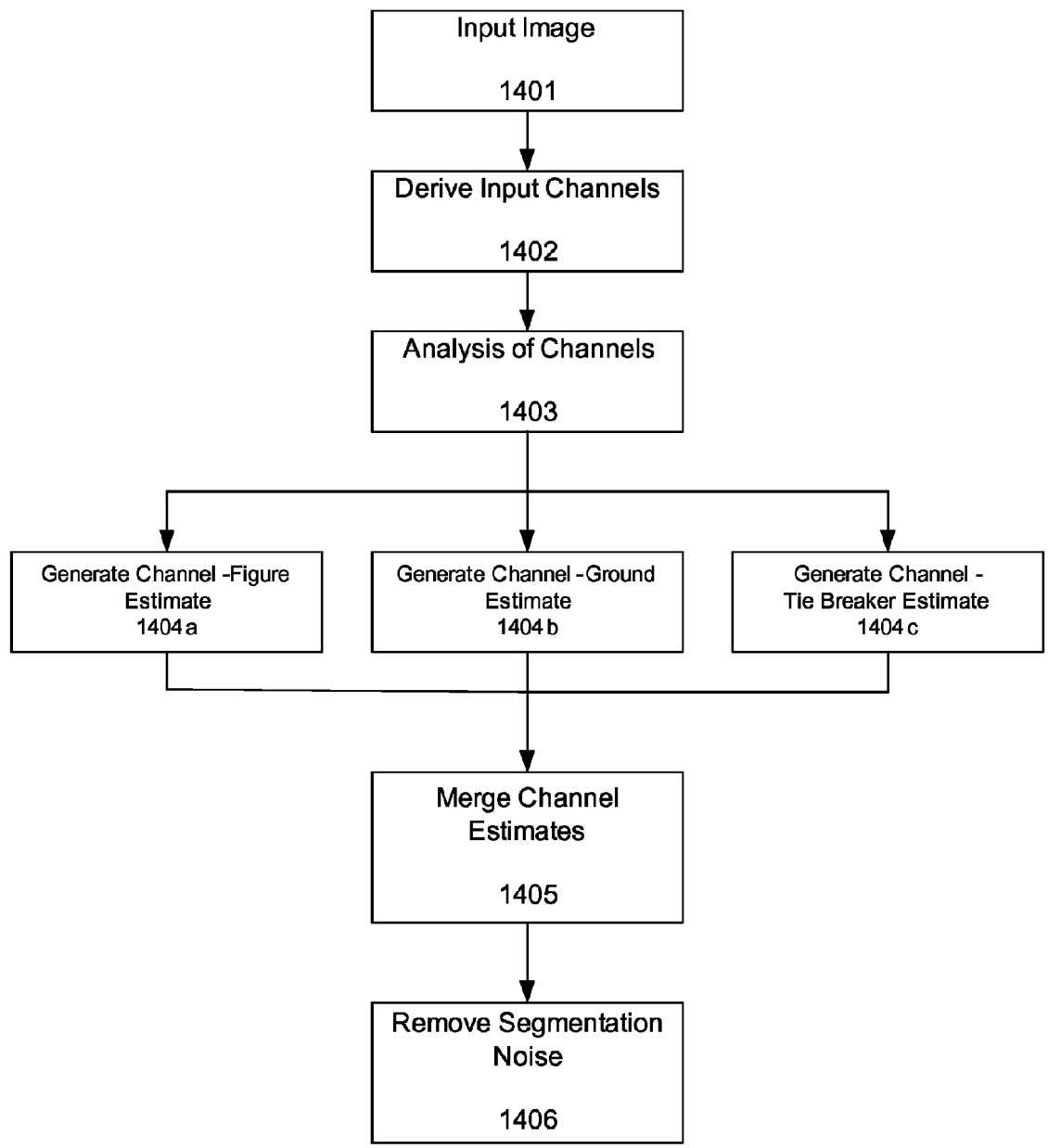
FIG. 3 is a diagrammatic illustration of an exemplary partly autonomous computer-implemented algorithm which effectuates a segmentation of an image based on perceptual information.

FIG. 3 is a diagrammatic illustration of an exemplary partly autonomous computer-implemented algorithm that effectuates a segmentation of an image based on perceptual information and is therefore an exemplary figure ground segmentation system 101. It will be apparent to one of skill in the art that an advantageous aspect of the disclosed systems and methods is their ability to utilize any figure ground segmentation system 101.

A description of the exemplary figure ground segmentation system 101 of FIG. 3 will now be disclosed in further detail. Initially, an image is inputted into an algorithm at step 1401. Input channels for the image are then derived in step 1402. The channels that are created or derived in step 1402 represent subregions of the image sharing common visual attributes. Examples of visual attributes include, but are not limited to, color, or complex derived attributes based on local microstructure, such as texture or local region color palette. For this embodiment, the present invention will be discussed utilizing color as the common visual attribute. One skilled in the art will recognize that a similar or comparable process may be done for other visual attributes.

In one exemplary embodiment, to create or derive the input channels in step 1402, the image data is color binned. Color binning can be performed on the white anchored image data either by using a fuzzy inference system, or by referring to lookup tables previously generated by the fuzzy inference system. The fuzzy inference system may determine fuzzy membership values for each image pixel relative to one or more colors. After color binning, the image data is converted into a set of channels in step 1402. The number of colors that are analyzed using the fuzzy inference system determines the number of colors in the output set from the color binning operation.

An exemplary alternative method for creating or deriving the input channels in step 1402 is to analyze the image for texture information. Texture typically involves spatially repeating microstructure patterns in the image. These microstructure patterns may be luminance-based, as in the vertical lines making up a field of grass in an outdoor scene. The microstructure patterns may also involve spatially replicated color variation, such as the alternating red and white regions of a brick wall. A texture processing module will typically analyze both luminance-based and color-based patterns and map the most prevalent patterns to individual input channels. Whereas with color binning, described above, where each color, such as red or blue, maps to an input channel, in texture binning each prominent textural pattern, such as vertically oriented green grass or a red/white brick region, is mapped to its own input channel. The number of input channels may be set arbitrarily or determined dynamically.

In some embodiments, two or more channels, three or more channels, four or more channels, five or more channels, between two and fifty channels, or less than thirty channels are derived in step 1402.

Each input channel from step 1402 is then analyzed in step 1403 according to heuristic metrics derived, for example, from Gestalt psychology research (e.g., dominance, outerness, and centeredness as discussed below). It should be evident to one skilled in the art that analysis of each input channel can be conducted using one or more heuristic metrics, or processing units. Examples of heuristic metrics include, but are not limited to, dominance, outerness, and centeredness. The "dominance" heuristic metric refers to the spatial extent of a region as measured by the fraction of the image's pixels that are included in a given channel. The underlying observation for the dominance heuristic metric is that the background of an image tends to contain a larger number of consistently colored pixels relative to the foreground of the image. Thus, a channel based on a particular color in which a significant portion of the highly weighted pixels in the channel fall in the same region of the image and have the same color will obtain a high score for the dominance heuristic. For example, consider an image that contains a subject wearing a blue tie against a backdrop of a blue sky in which a channel based on the color blue has been created in step 1402. The blue pixels in blue sky receive high weights. In fact the color channel is dominated by contiguous blue pixels in the blue sky. Each of these blue pixels in the blue sky has a similar color. Thus, in this instance, even though some of the blue pixels in the blue channel are found in the tie worn by the subject in the image, the color channel is dominated by the pixels that all have a similar blue color that are in the blue sky. In contrast, a channel based on a particular color in which a significant portion of the highly weighted pixels in the channel have highly divergent colors will obtain a low score for the dominance heuristic.

The "outerness" heuristic metric refers to the degree to which a region described by a channel occupies the area near the image frame. In one embodiment, the underlying observation for the outerness heuristic metric is the observation that colors appearing near the edge of the image frame are more likely to belong to the background than foreground of the image. For example, the pixels near the edge of the image may be weighted more highly than pixels near the center.

The "centeredness" heuristic metric refers to the degree to which pixels included in a channel occupy the central area of the image. In one embodiment, the underlying observation for the centeredness heuristic metric is that pixels near the center of the image are more likely to belong to the foreground of the image than to the background of the image. For example, the pixels near or at the center of the image may be weighted more highly than pixels near the image frame. An example of an image having a channel that receives a high centeredness score under the centeredness heuristic metric is an image in which the only blue pixels in the image are contained within a blue tie worn by a subject (e.g., there is now blue sky visible in the image). For a blue color channel for the image, only pixels that are in the blue tie will receive a high weight and these pixels are located at the center of the image.

Thus, in step 1403, each input channel is scored against one or more heuristics. In such embodiments, each heuristic is used to give an input channel a score. For example, an input channel may have a separate score for dominance, outerness, and centeredness. Once each input channel has been analyzed in step 1403 according to one or more heuristic metrics, one or more categorical estimates are created 1404 for the image under analysis. A categorical estimate can be derived based on the likelihood, for example represented as a ranking or a score, of one or more channels being part of the categorical estimate. In some embodiments, a categorical estimate involves the combination of those input channels in the plurality of input channels that are most likely to belong in a certain category such as foreground or background. In one example, the categorical estimate is a foreground channel estimate and it is determined that the red channel and the blue channel should contribute to the foreground channel estimate but that the yellow channel should not. In typical embodiments, if a channel has a strong likelihood of being part of a categorical estimate, it will be utilized in the creation of the categorical estimate. The creation of the likelihood (hereinafter "score") can comprise any conventional form of creation, including utilizing a proprietary algorithm to combine the results of the analysis of heuristic metrics and/or processing the score with a threshold.

Referring to FIG. 3, in one embodiment, the categorical estimates created are the foreground channel estimate (generate foreground channel estimate 1404a), and the background channel estimate (generate background channel estimate 1404b). In one embodiment, the scores created for the foreground channel estimate utilize a different algorithm than the algorithm utilized to create the scores for the background channel estimate. For example, the data from each heuristic metric analysis will be processed with different algorithms and/or different thresholds for the foreground channel estimate score than the algorithms and/or thresholds utilized for the background channel estimate score.

In some embodiments, each input channel from step 1403 will have a score for the foreground channel estimate and an independent score for the background channel estimate. In one embodiment, the score is utilized to determine whether a certain channel is utilized in creating a categorical estimate 1404 (e.g., an estimate 1404a, 1404b, or 1404c). For example, the score created for the foreground channel estimate for the channel red might have a value of 0.85, the score created for the foreground channel estimate for the channel blue might have a value of 0.75, and the score created for the foreground channel estimate for the channel pink might have a value of 0.25. In one embodiment, one may chose to utilize channels that meet a certain threshold value for the score to determine which channels to utilize in creating the foreground channel estimate 1404*a* and the same or different threshold value to determine which channels to utilize in creating the background channel estimate 1404*b*. For example, if the threshold value selected for the foreground channel estimate score is defined as greater than or equal to 0.60, than channel red and channel blue would be utilized in merging the channel categorical estimate (e.g. foreground channel estimate 1404*a*). A similar procedure could be utilized to select the one or more channels that will be merged to create the background channel estimate 1404*b*

After selecting or determining, for each respective categorical estimate (e.g., foreground channel estimate 1404*a*, background channel estimate 1404*b*, tie breaker channel estimate 140*c*), which channel or channels will be utilized to create the respective categorical estimate (e.g., which channels will be used to compute figure estimate 1404*a*, ground estimate 1404*b*, and tie breaker estimate 1404*c*), the one or more channels are utilized to do so. In one embodiment, the channels selected to create a channel estimate 1404 are merged or combined. The operation in which channels are merged or otherwise combined can comprise any conventional form of merging or combination of two or more channels of data, including pixel by pixel, based on the pixel weight per channel being combined. For example, consider the case in which channels A and B are being combined to generate a foreground channel estimate and a pixel that is present in both channels A and B is being considered to determine what strength the pixel will be assigned in the foreground channel estimate. In some embodiments, the strength of the pixel in the foreground channel will be a function of (i) the weight of the pixel in channel A modified by a score assigned to channel A against the one or more heuristics and (ii) the weight of the pixel in channel B modified by a score assigned to channel B against the one or more heuristics. If more than two channels (e.g., component channels) are being combined to form a foreground channel estimate, than the strength of a pixel in the foreground channel estimate that is present in all of the individual component channels will be the combination of the weight of the pixel in each component channel where each respective weight is modified by the score of corresponding component channel.

In some embodiments, a pixel by pixel approach allows for processing the merger or combination operation to form a channel estimate 1404 based on the pixel weight determined per pixel within each channel. As illustrated above, in some embodiments, a weight is assigned to a pixel within a channel based on its fuzzy membership to the color associated with the channel. In some embodiments, the categorical estimate is created pixel by pixel depending on the pixel's weight per channel selected and per each channel the pixel is included in. From the example above, the channel red and the channel blue are selected to create the foreground channel estimate. To do so, the channel red and the channel blue are merged or combined (hereinafter "combined"). In one embodiment, all the pixels within the channel or channels selected for a respective categorical estimate 1404 are included to create the categorical estimate. In this example, this would mean all the pixels which where selected in the channel red and the channel blue are selected or combined to create the foreground channel estimate 1404*a*.

In an alternative embodiment, all the pixels from all the selected channels receive a strength or weight value (hereinafter "strength") for a categorical estimate 1404, based on the pixel's weight and channel's or channels' scores. Calculating the strength may provide for one way of calculating the certainty of each pixel within the categorical estimate. In one embodiment, the strength is determined by the pixel weight multiplied by the score of the channel the pixel is included in. In one example, the strength of a pixel is 0.49 if the weight of the pixel is 0.70 and the score of the channel the pixel is included in is 0.70 (e.g., 0.70×0.70). In one embodiment, the strength is utilized to create a categorical estimate 1404. More information on how to select pixels within selected channels to create estimates 1404 are described in published United States patent application entitled, "Systems and Methods for Segmenting an Image Based on Perceptual Information," publication number 20080247647, filed Apr. 2, 2008 which is assigned to the assignee of the present application and the respective disclosure of which is hereby incorporated by reference herein in its entirety.

As should be evident to one skilled in the art, the threshold for score values, as set forth above, might lead to one or more channels that are not included in certain categorical estimates (e.g., 1404*a* or 1404*b*). In this situation, a generic or tie breaker channel estimate 1404*c* can be created or utilized. The purpose of the tie breaker channel estimate 1404*c* can be to utilize the information from the channel or channels not utilized in the other categorical estimates. It will be evident to one skilled in the art that the tie breaker channel estimate may not be used if all channels can be utilized by the other categorical estimates.

In the embodiment illustrated in FIG. 3, a tie breaker channel estimate 1404*c* is generated for any channel or channels that do not get utilized by the foreground channel estimate 1404*a* or the background channel estimate 1404*b* generation. In the example given above, this may be due to the score of a channel not falling within the threshold required for each categorical estimate generation.

Creating a tie breaker channel estimate operation can comprise any conventional form of creating a tie breaker channel estimate with channels not utilized by the other categorical estimates, including combining the information per pixel in each channel. In one embodiment, the tie breaker channel estimate is created by obtaining a tie breaker channel estimate score for each channel not utilized in the other categorical estimates, and then combining the channels as illustrated above. In one example, the score for a channel as created for the tie breaker channel estimate is created by subtracting the score for that channel as created for the foreground channel estimate from the score for that channel as created for the background channel estimate. Utilizing this score, the tie breaker channel estimate can be created by combining all the channels not utilized in the other categorical estimates in a pixel by pixel approach as illustrated above. For example, utilizing the strength of each pixel, as illustrated above, the tie breaker channel estimate can be created.

In some embodiments, after two or more categorical estimates are derived or created (e.g. 1404*a* and 1404*b*), the categorical estimates are merged to create a final channel estimate. For example, referring to step 1405 of FIG. 3, after the foreground channel estimate 1404*a*, the background channel estimate 1404*b*, and/or tie breaker channel estimate 1404*c* are created they are combined or merged. This combining or merging can be done on a pixel by pixel basis. For example, the merging can be done to create the distinguishing or segmenting of foreground of an image from the background of an image or vice versa. The combining or merging of the categorical estimates operation can comprise any conventional form of combining or merging the data in the categorical estimates. In one embodiment, the foreground channel estimate is averaged with the inverse of the background channel estimate and the tie breaker estimate is added in. An example of this method is illustrated in the equation:

$$FI = ((FCE + (1 - BCE))/2) + TBCE$$

In the formula, FI represents the foreground of the image as a final channel estimate, FCE is the foreground channel estimate 1404a; BCE is the background channel estimate 1404b, and TBCE is the tie breaker channel estimate 1404c. Advantageously, this combining or merging operation causes each pixel of the image being processed to be categorized into either the foreground or background with more certainty.

Another example of this method is:

$$FI_i = ((w_{i1}(FCE_i)^{w_{i2}} + w_{i3}(1 - BCE_i)^{w_{i4}})/N) + w_{i5}(TBCE_i)^{w_{i6}}$$

where $FI_i$ is a value indicating whether pixel i is in the foreground of the image;

$FCE_i$ is a strength of pixel i in the foreground channel estimate;

$BCE_i$ is a strength of pixel i in the background channel estimate;

$TBCE_i$ is a strength of pixel i in the tie breaker channel estimate;

N is a positive real number; and $w_{i1}$, $w_{i2}$, $w_{i3}$, $w_{i4}$, $w_{i5}$, and $w_{i6}$ are each independently a weight for pixel i.

Each of $w_{i1}$, $w_{i2}$, $w_{i3}$, $w_{i4}$, $w_{i5}$, and $w_{i6}$ can be a weight of any kind, including any mathematical operation, any value. Each $w_{i1}$, $w_{i2}$, $w_{i3}$, $w_{i4}$, $w_{i5}$, and $w_{i6}$ can be the same or different. In some embodiments, N is $w_{i1} + w_{i3}$.

Optionally, the final merged estimation of step 1405 may have pixel noise removed in step 1406 from the segmentation. The pixel noise is made up of small incorrectly classified image regions. These incorrectly classified regions form "pixel islands" or "holes" in the segmentation. The noise removal of step 1406 involves the application of various techniques to reclassify small regions from figure to ground (so-called "island removal") or vice versa (so called "hole filling"). While the noise removal step may make some mistakes, on the whole it will improve the overall region classification into figure and ground. For example, if a pixel is classified as figure, but is surrounded by pixels classified as ground, it is likely to be spurious and can be removed from the figure by switching its classification. A figure ground segmentation operation set forth above can comprise any other conventional type of figure ground segmentation operation such as in the manner set forth in published United States patent application entitled, "Systems and Methods for Segmenting an Image Based on Perceptual Information," publication number 20080247647, filed Apr. 2, 2008 which is assigned to the assignee of the present application and the respective disclosure of which is hereby incorporated by reference herein in its entirety.

Figure 4:
FIG. 4 contains FIGS. 4(a) and 4(b) which respectively represent exemplary figure mask estimations for images 2(a) and 2(b).
Figure 4:

Figure ground segmentation system 101 produces information that represents the categorization of any number of pixels or pixel regions as either "figure" or background (not "figure"). This information is represented in any of variety of ways. In some embodiments, the information is represented such that it may be processed further by the systems and methods disclosed. For example, in some embodiments, the information is represented by creating a "figure mask." It should be apparent to one of skill in the art that a figure mask created based on such information is one of many different ways that the information could be represented. Advantageously, the representation of the information can be done in any way that faithfully represents such information. In the embodiment described in FIG. 1, the information is referred to as figure mask estimation 102. In some embodiments, optional process 102 is utilized to create a representation of the information (such as a figure mask estimation) such that the information may be processed further by the systems and methods disclosed. Examples of figure mask estimations 102 are provided in FIG. 4, as FIGS. 4(a) and 4(b) for images of FIGS. 2(a) and 2(b), respectively. The figure mask estimation is a representation of information mentioned above—that is, categorization of any number of pixels or pixel regions as either "figure" or background. As seen in FIGS. 4(a) and 4(b), most of the pixels or pixel regions that would arguably be considered the "figure" in the images have been categorized as such by allowing those pixels or pixel regions to remain in the image mask (represented by the color white in FIG. 4), while most of the area that would arguably be considered background has been removed (represented by the color black in FIG. 4). It will be noted that the figure mask estimations of FIG. 2, as illustrated in FIG. 4, contains deficiencies because figure ground segmentation systems 101 do not create perfect results.

As used herein, a mask is defined as a binary image, where each pixel is assigned a value of 1 (e.g. "true") when the given condition is satisfied and 0 (e.g. "false") otherwise. For example, in one embodiment, in a figure mask, all pixels which are part of the "figure" are assigned a value of 1, and 0 otherwise whereas, in a "ground mask", all pixels which are part of the "ground" are assigned a value of 1, and 0 otherwise.

As set forth above, steps 101 and 102 of FIG. 1 serve to generate an initial figure mask estimation of the image using a figure ground segmentation system to thereby initially assigning each pixel in the image with a first attribute value (e.g., "figure") or a second attribute value (e.g., background). This initial figure mask estimation is then refined as disclosed below in conjunction with FIG. 1.

Figure 5:
FIG. 5 contains FIGS. 5(a) and 5(b) which respectively represent exemplary JigCut Regions for images 2(a) and 2(b).
Figure 5:
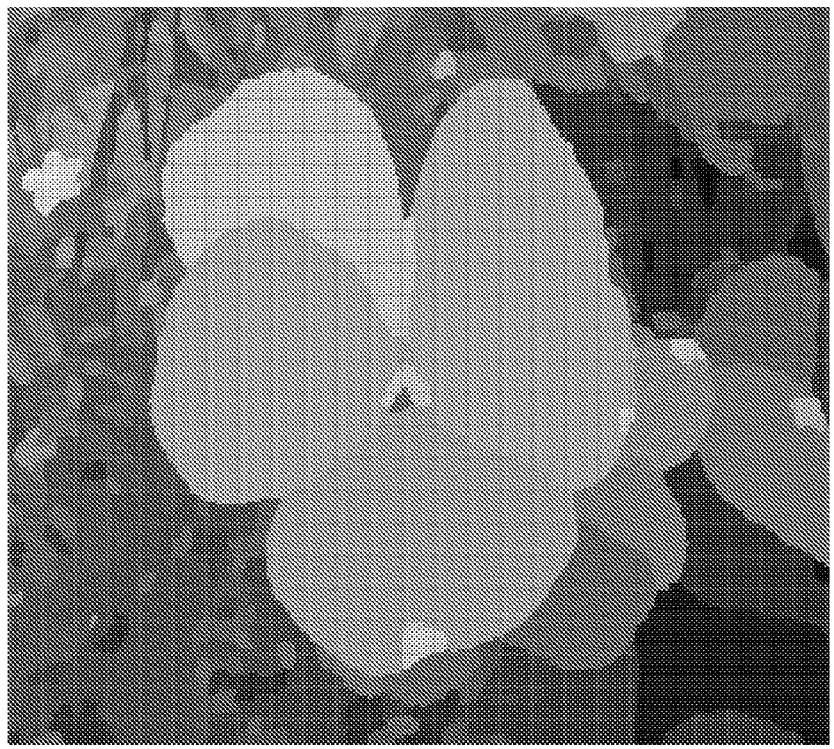

In the embodiment described above in conjunction with FIG. 1, a JigCut region segmentation 103 for digital image 100 would also occur. As defined above, there are several approaches to this type of region segmentation such as normalized cut, mean-shift, and watershed transform. Each of these approaches are known and one of skill in the art would appreciate that the JigCut Region Segmentation could occur from any of these approaches or any other approach that would effectuate the JigCut region segmentation. Examples of the JigCut region segmentation 103 are provided in FIG. 5, with FIGS. 5(a) and 5(b) representing the JigCut Regions for FIGS. 2(a) and 2(b), respectively. For this embodiment, the JigCut regions as represented in FIGS. 5(a) and 5(b) are displayed using the average colors in each of the regions.

Figure 6:
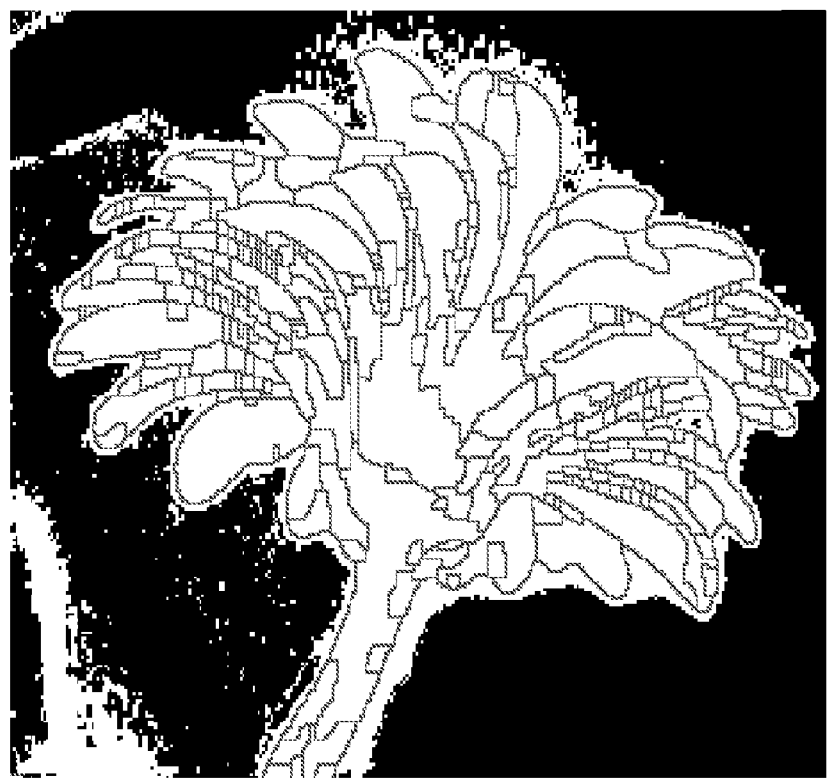
FIG. 6 contains FIGS. 6(a) and 6(b) which respectively illustrate the overlaying of exemplary JigCut Regions for images 2(a) and 2(b) on the exemplary figure mask estimations 4(a) and 4(b).
Figure 6:
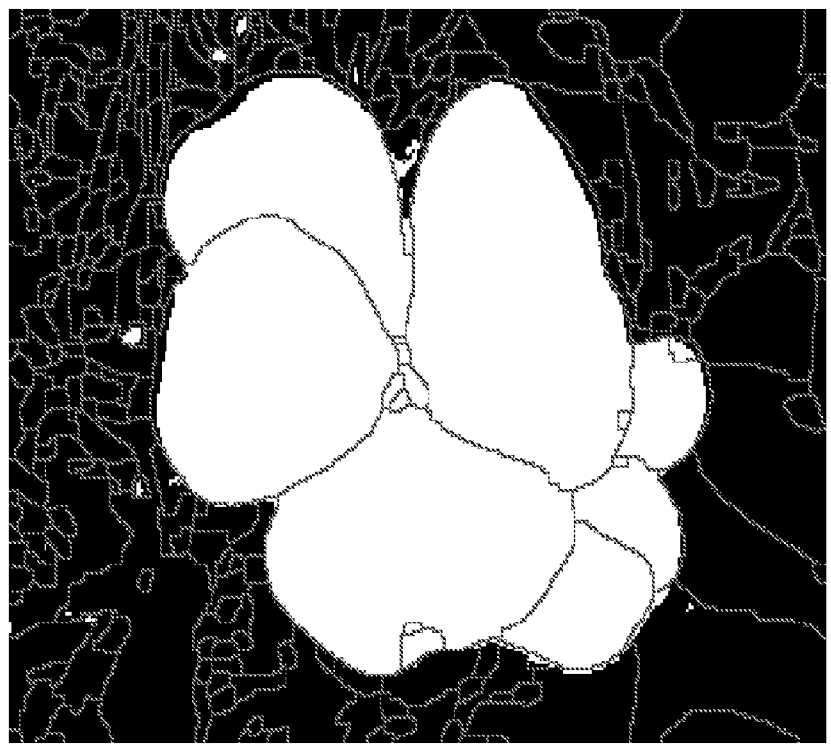

With the JigCut region segmentation 103 and the figure mask estimation 102, the exemplary method then processes the figure mask estimation with the JigCut region segmentation 104 to improve the estimation of the "figure" within the image. This step requires the evaluation of the JigCut region segmentations with the figure mask estimation for the image. A representation of this process is displayed in FIG. 6. As can be seen in FIGS. 6(a) and 6(b), the JigCut regions of FIGS. 2(a) and 2(b), respectively, are overlaid representations of the figure mask estimations of FIGS. 4(a) and 4(b), respectively. Each JigCut region is then classified as "figure" or background (not-figure). If a certain number or percentage of the pixels within each JigCut region falls within the figure mask estimation's of "figure", then the entire JigCut Region is categorized as "figure." The number or percentage of pixels within the JigCut Regions required to classify the region as "figure" can be set or changed based on the type of image being processed or based on the confidence in the figure mask estimation. In one exemplary embodiment, the percentage threshold is set to 50%. In other embodiments, the percentage threshold is set to 30% or greater, 40% or greater, 50% or greater, 60% or greater, 70% or greater, or 80% or greater. As should be apparent, an advantageous aspect of this approach is the refinement of the boundary for the "figure" mask produced by step 102 using the JigCut region segmentation of step 103. With this approach, the boundary should be able to follow the true region boundaries of the image itself, thereby providing for the true region boundaries for the "figure." It will be apparent to one skilled in the art that the better the figure mask estimation is to the true "figure" of the image, the higher the probability of improving the figure mask estimation using the JigCut region segmentation 103 to reach the true "figure" of the image.

Though described locally above, the approach can be viewed globally as well. An example of a global approach is to select or deselect JigCut Regions so that the union of the selected JigCut Regions closely resemble the figure mask estimation. In other words, JigCut regions are selected or deselected to minimize a global approximation error. JigCut regions could be characterized as quantized regions. The approximation error is equivalent to region-based quantization error. This global approach can be viewed as an orthogonal projection onto the scale space of quantized regions.

Figure 7:
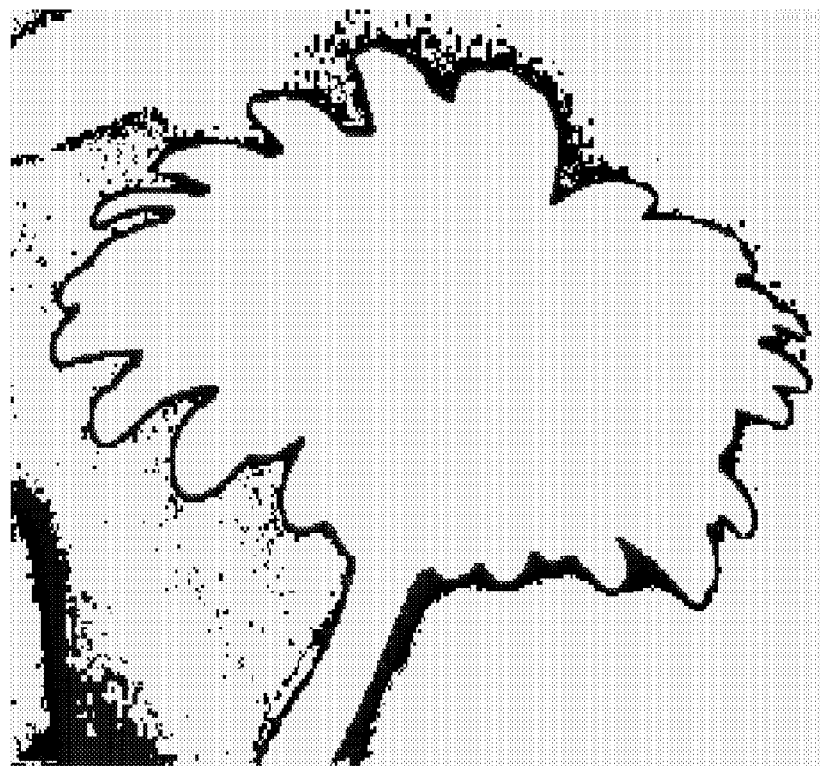
FIG. 7 shows the pixels that were part of the "figure" in the original exemplary figure mask estimations 4(a) and 4(b) for images 2(a) and 2(b), respectively, but which are removed by "Process Figure Mask Estimation with JigCut Region Segmentation" in FIG. 1.
Figure 7:
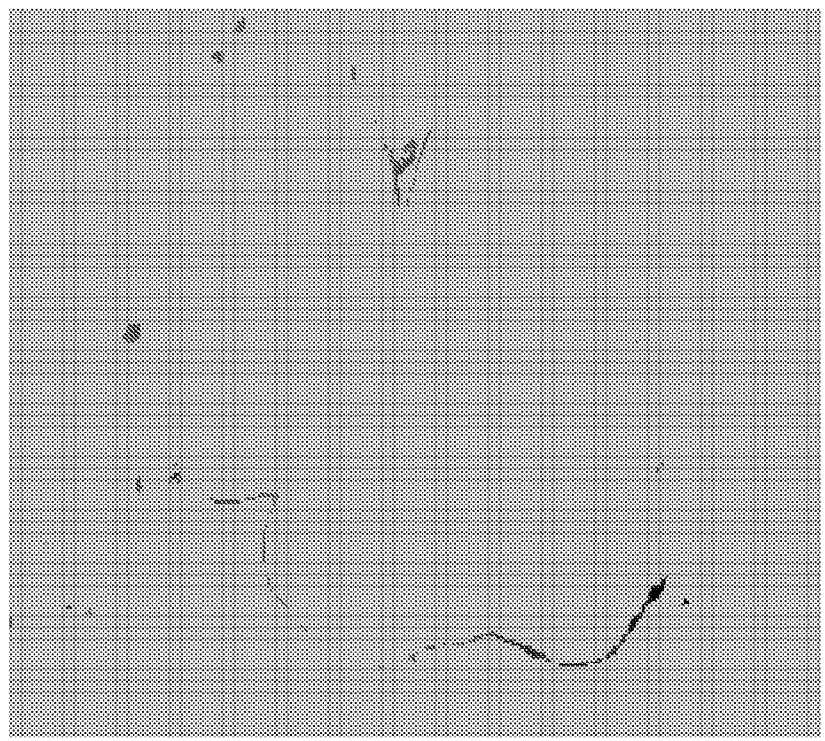
Figure 8:
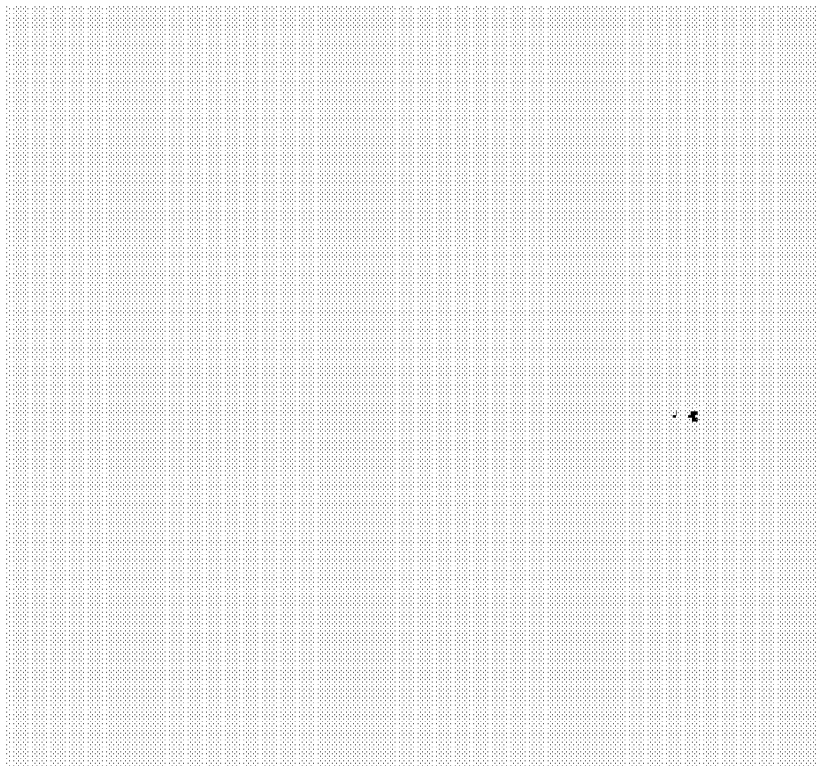
FIG. 8 shows the pixels that were part of the "background" in the original exemplary figure mask estimations 4(a) and 4(b) for images 2(a) and 2(b), respectively, but which are added to "figure" by "Process Figure Mask Estimation with JigCut Region Segmentation" in FIG. 1.
Figure 8:
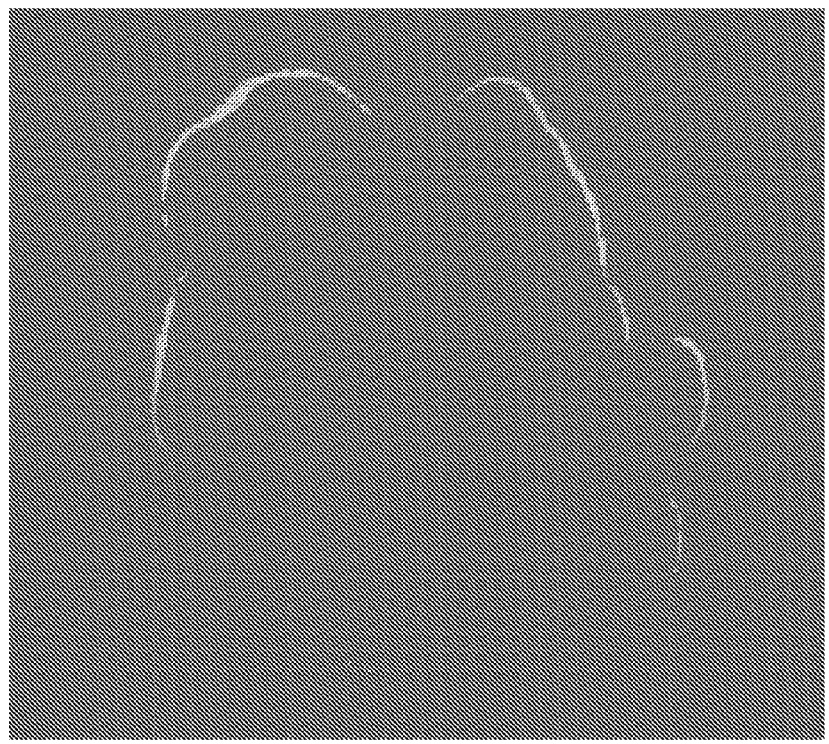
Figure 9:
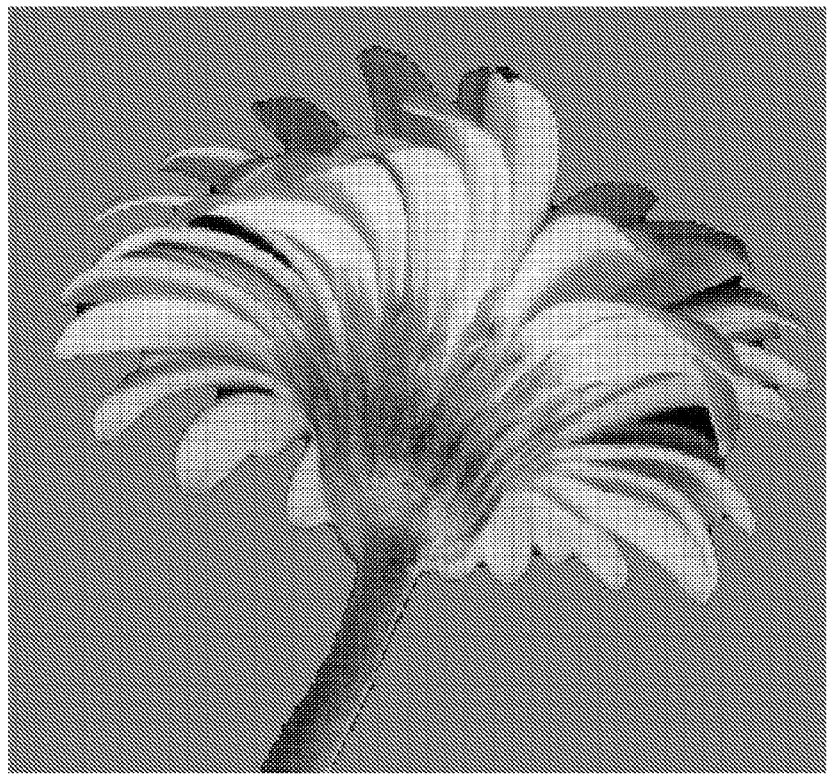
FIG. 9 contains 9(a) and 9(b) which are exemplary improved figure masks for images 2(a) and 2(b) according to one embodiment of the present invention.
Figure 9:
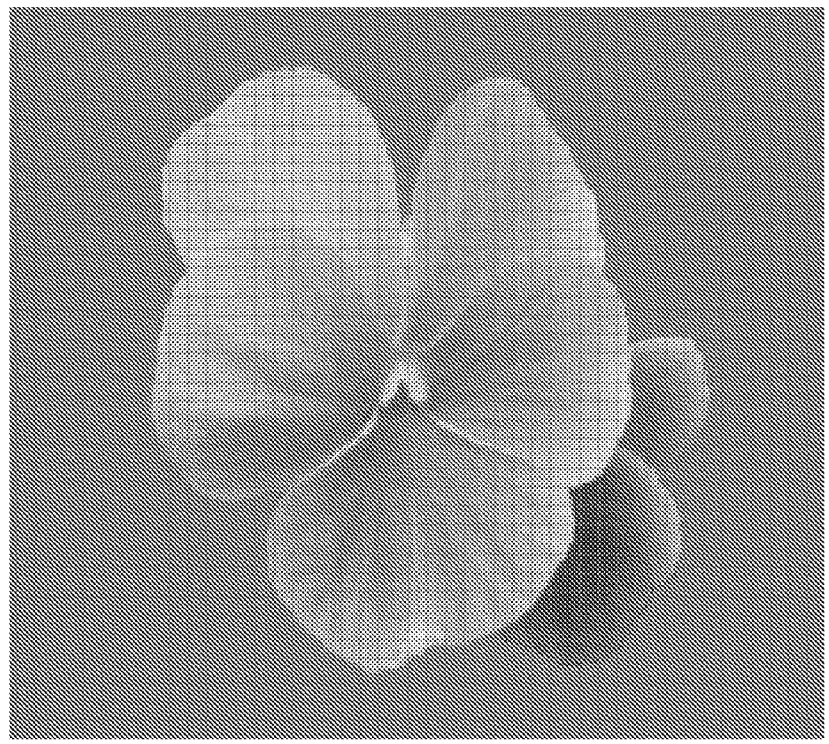

FIG. 7, in 7(a) and 7(b), shows the pixels that where part of the "figure" in the original figure mask estimation of FIGS. 4(a) and 4(b) for FIGS. 2(a) and 2(b), respectively, but were removed in step 104. FIGS. 8(a) and 8(b) shows the pixels that were part of the "background" in the original figure mask estimation of FIGS. 4(a) and 4(b) for FIGS. 2(a) and 2(b), respectively, but were added to the "figure" in step 104 (FIG. 1). The embodiment of the present invention as described in FIG. 1 would then produce the improved or corrected figure mask 105. FIGS. 9(a) and 9(b) are the respective improved or corrected figure masks created for FIGS. 2(a) and 2(b).

Figure 10:
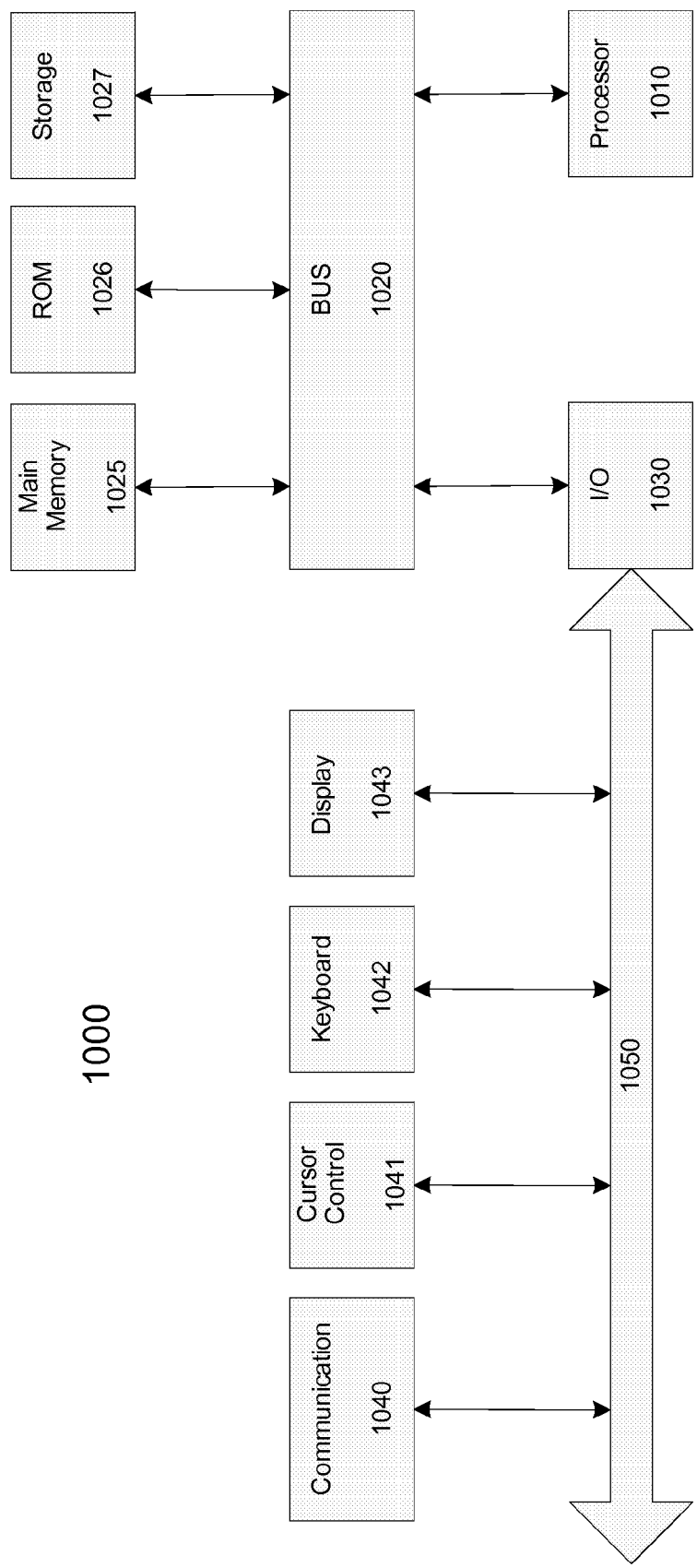
FIG. 10 is a block diagram of an exemplary computer architecture for use with the present system, according to one embodiment of the present invention.

FIG. 10 is an illustration of an exemplary computer architecture for use with the present system, according to one embodiment. Computer architecture 1000 is used to implement the computer systems or image processing systems described in various embodiments of the invention. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010.

A data storage device 1027 such as a magnetic disk or optical disk and its corresponding drive is coupled to computer system 1000 for storing information and instructions. Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed:

1. A method of creating a figure mask estimation for an image, wherein the image comprises a plurality of pixels, the method comprising:
    (A) generating an initial figure mask estimation of the image using a figure ground segmentation system, thereby initially assigning each pixel in the image with a first attribute value or a second attribute value;
    (B) generating a JigCut region segmentation of the image, wherein the JigCut region segmentation comprises a plurality of JigCut regions;
    (D) utilizing at least one computer to process the figure mask estimation with the JigCut region segmentation by classifying each pixel in a JigCut region in the plurality of JigCut regions with the first attribute value when a first predetermined number or a first predetermined percentage of the pixels within the respective JigCut region have been initially assigned the first attribute value by the generating (A), and by
    classifying each pixel in a JigCut region in the plurality of JigCut regions with the second attribute value when a second predetermined number or a second predetermined percentage of the pixels within the respective JigCut region have not been initially assigned the first attribute value by the generating (A),
    thereby generating a second figure mask estimation of the image in which the first attribute value is assigned to each pixel in a first set of pixels in the plurality of pixels and the second attribute value is assigned to each pixel in a second set of pixels in the plurality of pixels; and
    (D) outputting the second figure mask estimation to a user interface device, a monitor, a tangible computer-readable storage medium, a computer-readable memory, or a local or remote computer system; or displaying the improved figure mask estimation.

2. The method of claim 1, wherein the first predetermined percentage is at least fifty percent and wherein the second predetermined percentage is at least fifty percent.

3. The method of claim 1, wherein the first predetermined percentage is at least seventy percent and wherein the second predetermined percentage is at least seventy percent.

4. The method of claim 1, wherein the first predetermined percentage is at least eighty percent and wherein the second predetermined percentage is at least eighty percent.

5. The method of claim 1, wherein the first attribute value represents a figure in the image and the second attribute value represents background.

6. The method of claim 1, wherein the generating (A) comprises:
  (i) deriving a plurality of input channels for the image, wherein each input channel in the plurality of input channels is for each subregion of the image sharing at least one common visual attribute;
  (ii) analyzing each respective channel in the plurality of input channels using one or more heuristic metrics;
  (iii) deriving an estimate, for each respective channel in the plurality of channels, of the likelihood that the pixel regions described by respective channel have the first attribute value or have the second attribute value using (a) a first attribute value estimate, (b) a second attribute value estimate and, optionally, (c) a tie breaker estimate; and
  (iv) merging, for each respective channel in the plurality of channels, each estimate computed in step (iii) for the respective channel to construct a final estimate for the respective channel thereby assigning each pixel in the respective channel with the first attribute value or the second attribute value.

7. The method of claim 6, wherein a heuristic metric in said one or more heuristic metrics is dominance, outerness, or centeredness.

8. The method of claim 6, wherein the at least one common visual attribute is a color and wherein the deriving step comprises a color binning of said image.

9. The method of claim 8, wherein the color binning is performed on white anchored data of the image by a fuzzy inference system or by referring to a preexisting lookup table previously generated by the fuzzy inference system.

10. The method of claim 6, wherein the at least one common visual attribute is a local microstructure.

11. The method of claim 10, wherein the local microstructure is a texture or a local region color palette.

12. A system for labeling a plurality of pixels in an image comprising a processor and a memory, the memory storing instructions for carrying out the method of claim 1.

13. A computer program product stored on a nontransitory computer-readable medium for use in conjunction with a computer system, the computer program comprising readable storage medium and a computer program mechanism embedded therein, the computer program mechanism comprising instructions for performing the method of claim 1.

14. A system for labeling a plurality of pixels in an image comprising processor and a memory, the memory storing
  (A) means for generating an initial figure mask estimation of the image using a figure ground segmentation system, thereby initially assigning each pixel in the image with a first attribute value or a second attribute value;
  (B) means for generating a JigCut region segmentation of the image, wherein the JigCut region segmentation comprises a plurality of JigCut regions;
  (D) means for utilizing at least one computer to process the figure mask estimation with the JigCut region segmentation by
    classifying each pixel in a JigCut region in the plurality of JigCut regions with the first attribute value when a first predetermined number or a first predetermined percentage of the pixels within the respective JigCut region have been initially assigned the first attribute value by the generating (A), and by
    classifying each pixel in a JigCut region in the plurality of JigCut regions with the second attribute value when a second predetermined number or a second predetermined percentage of the pixels within the respective JigCut region have not been initially assigned the first attribute value by the generating (A),
  thereby generating a second figure mask estimation of the image in which the first attribute value is assigned to each pixel in a first set of pixels in the plurality of pixels and the second attribute value is assigned to each pixel in a second set of pixels in the plurality of pixels; and
  (D) means for outputting the second figure mask estimation to a user interface device, a monitor, a tangible computer-readable storage medium, a computer-readable memory, or a local or remote computer system; or displaying the improved figure mask estimation.

* * * * *